US009755725B2

(12) United States Patent
Morioka

(10) Patent No.: US 9,755,725 B2
(45) Date of Patent: Sep. 5, 2017

(54) RELAY DEVICE, RELAY METHOD, WIRELESS COMMUNICATION SYSTEM, BASE STATION, AND WIRELESS COMMUNICATION DEVICE

(75) Inventor: Yuichi Morioka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 107 days.

(21) Appl. No.: 13/702,648

(22) PCT Filed: Jun. 7, 2011

(86) PCT No.: PCT/JP2011/062990
§ 371 (c)(1),
(2), (4) Date: Dec. 7, 2012

(87) PCT Pub. No.: WO2011/158688
PCT Pub. Date: Dec. 22, 2011

(65) Prior Publication Data
US 2013/0083723 A1 Apr. 4, 2013

(30) Foreign Application Priority Data

Jun. 18, 2010 (JP) .................................. 2010-139935

(51) Int. Cl.
*H04W 4/00* (2009.01)
*H04B 7/15* (2006.01)
(Continued)

(52) U.S. Cl.
CPC ............... *H04B 7/15* (2013.01); *H04B 7/155* (2013.01); *H04L 49/9057* (2013.01);
(Continued)

(58) Field of Classification Search
CPC .... H04B 7/2606; H04B 7/15; H04B 7/15542; H04B 7/15557; H04B 7/15592;
(Continued)

(56) References Cited

U.S. PATENT DOCUMENTS

2008/0002741 A1* 1/2008 Maheshwari .......... H04B 7/155
370/473
2008/0247313 A1* 10/2008 Nath ........................ H04Q 9/00
370/231

(Continued)

FOREIGN PATENT DOCUMENTS

JP  WO 2006/035902 A1  4/2006
JP  2007-60212 A  3/2007

(Continued)

OTHER PUBLICATIONS

Multicast Recipient Maximization in IEEE 802.16j WiMAX Relay Networks; Wen-Hsing Kuo; Jeng-Farn Lee; Jan. 20, 2010.*

(Continued)

*Primary Examiner* — Marsha D. Banks Harold
*Assistant Examiner* — Elton Williams
(74) *Attorney, Agent, or Firm* — Chip Law Group

(57) ABSTRACT

Provided is a relay device including a receiving unit for receiving information from a plurality of wireless communication devices, a storage unit for accumulating the information received from the plurality of wireless communication devices by the receiving unit, an information processing unit for aggregating the information accumulated in the storage unit, and a transmitting unit for transmitting the information aggregated by the information processing unit to a base station.

12 Claims, 11 Drawing Sheets

(51) Int. Cl.
*H04B 7/155* (2006.01)
*H04L 12/861* (2013.01)
*H04W 28/02* (2009.01)
*H04W 84/04* (2009.01)

(52) U.S. Cl.
CPC ....... *H04W 4/006* (2013.01); *H04W 28/0215* (2013.01); *H04W 84/047* (2013.01)

(58) Field of Classification Search
CPC .............. H04W 4/005; H04W 84/047; H04L 2001/0097; H04L 25/24
USPC ...................................................... 370/315
See application file for complete search history.

(56) References Cited

U.S. PATENT DOCUMENTS

| | | |
|---|---|---|
| 2009/0085769 A1 | 4/2009 | Thubert et al. |
| 2009/0175214 A1* | 7/2009 | Sfar et al. ............... 370/315 |
| 2011/0053619 A1* | 3/2011 | Shaheen et al. .......... 455/466 |
| 2011/0122807 A1 | 5/2011 | Onodera et al. |
| 2011/0199905 A1* | 8/2011 | Pinheiro et al. ......... 370/235 |
| 2012/0063436 A1 | 3/2012 | Thubert et al. |

FOREIGN PATENT DOCUMENTS

| | | |
|---|---|---|
| JP | 2008-228179 A | 9/2008 |
| JP | 2009-207050 A | 9/2009 |
| WO | WO 2009/154255 A1 | 12/2009 |

OTHER PUBLICATIONS

3rd Generation Partnership Project; Technical Specification Group Services and System Aspects; Service requirements for Machine-Type Communications (MTC); Stage 1 (release 10); 3GPP TS 22.368 VI 0.0.0 (Mar. 2010).*

Extended European Search Report issued Jan. 8, 2014, in European Patent Application No. 11795596.3.

"Discussion on RACH design for MTC", Alcatel-lucent Shanghai Bell, Alcatel-lucent, 3GPP TSG RAN WG2#69, R2-101407, vol. RAN WG2, XP-050421660, San Francisco, USA, Feb. 22-26, 2010, 2 pages.

"3rd Generation Partnership Project; Technical Specification Group Services and System Aspects; System Improvements for Machine-Type Communications; (Release10) ", 3GPP Standard; 3GPP TR 23.888, No. V0.4.1, XP-050441502, Jun. 3, 2010, pp. 1-53.

* cited by examiner

— RELAY DEVICE, RELAY METHOD, WIRELESS COMMUNICATION SYSTEM, BASE STATION, AND WIRELESS COMMUNICATION DEVICE —

TECHNICAL FIELD

The present disclosure relates to a relay device, a relay method, a wireless communication system, a base station, and a wireless communication device.

BACKGROUND ART

At present, the standardization of 4G wireless communication system is being carried out in 3GPP (Third Generation Partnership Project). The 4G makes it possible to use techniques such as a relay or carrier aggregation, thereby improving the maximum communication speed and the quality at cell edges. Relay devices (relay nodes) that performs a relay are described, for example, in the Patent Literature below.

Meanwhile, there also has been a discussion concerning MTC (Machine Type Communications) in 3GPP. As an application of MTC, for example, a next-generation power transmission network called a Smart Grid is considered. When the Smart Grid is applied to the electric power meter which measures an electric power consumption of each home, it is considered that electric power consumptions of geographically remote locations can be aggregated and managed. Further, when the Smart Grid is applied to the individual power-consuming appliance in addition to the electric power meter, more flexible power management is possible. As other MTC applications, a variety of applications such as an application for collecting information relevant to health care instruments, an application for collecting sales information in a vending machine or the like have been considered. The MTC terminal is a terminal designed specifically for these applications.

CITATION LIST

Patent Literature

Patent Literature 1: JP 2006-035902S
Patent Literature 2: JP 2007-060212A

SUMMARY OF INVENTION

Technical Problem

It is, however, expected that the number of MTC terminals to be accommodated in each cell will be very large. Thus, as the number of links in each cell is increased, the number of received or transmitted control information such as scheduling information or authentication setting information is considered to be increased. Furthermore, the substantial number of the links will be doubled due to introducing a relay device. Thus, when the MTC terminal and relay device are employed, it is important to take measures to reduce network load.

Therefore, the present disclosure provides a novel and improved relay device, relay method, wireless communication system, base station, and wireless communication device, capable of mitigating the increase of network load by introducing a wireless communication device such as MTC terminal and a relay device.

Solution to Problem

According to an embodiment of the present disclosure, there is provided a relay device including a receiving unit for receiving information from a plurality of wireless communication devices, a storage unit for accumulating the information received from the plurality of wireless communication devices by the receiving unit, an information processing unit for aggregating the information accumulated in the storage unit, and a transmitting unit for transmitting the information aggregated by the information processing unit to a base station.

The storage unit may accumulate information having an amount less than or equal to a predetermined amount among the information received from the plurality of wireless communication devices. The transmitting unit may transmit information having an amount exceeding a predetermined amount among the information received from the plurality of wireless communication devices, to the base station in a state of not being aggregated with other information.

The information processing unit may aggregate the information accumulated in the storage unit in an intermittent manner.

The information processing unit may aggregate the information accumulated in the storage unit at a predetermined cycle.

The information processing unit may determine a timing at which each of allowable delay times of the information accumulated in the storage unit elapses and aggregate the information accumulated in the storage unit before an earliest timing among the timings of the allowable delay times elapses.

The information processing unit may aggregate the information accumulated in the storage unit when the number of pieces of information accumulated in the storage unit reaches a predetermined number.

The information processing unit may aggregate the information accumulated in the storage unit when a total amount of information accumulated in the storage unit reaches an upper limit value.

The accumulation unit may accumulate information received from a wireless communication device which is a MTC terminal. The information processing unit may aggregate information received from the wireless communication device which is the MTC terminal, and the transmitting unit may transmit the information received from the wireless communication device which is the MTC terminal to the base station in a state of being aggregated by the information processing unit, and transmit information received from a wireless communication device which is a non-MTC terminal to the base station in a state of not being aggregated with other information.

Further, according to an embodiment of the present disclosure, there is provided a relay device including a receiving unit for receiving information aggregated for a plurality of wireless communication devices from a base station, an information processing unit for obtaining individual information for each of the plurality of wireless communication devices based on the aggregated information received by the receiving unit, and a transmitting unit for individually transmitting the individual information obtained by the information processing unit to each of the plurality of wireless communication devices.

The information aggregated for the plurality of wireless communication devices is resource information, and the information processing unit may obtain the individual information by performing resource allocation to each of the plurality of wireless communication devices within a range of a resource indicated by the resource information.

The information aggregated for the plurality of wireless communication devices may include resource information for each of the plurality of wireless communication devices, and the information processing unit may obtain the resource information for each of the plurality of wireless communication devices as the individual information.

Further, according to an embodiment of the present disclosure, there is provided a relay method including a step of receiving information from a plurality of wireless communication devices, a step of accumulating the information received from the plurality of wireless communication devices, a step of aggregating the accumulated information, and a step of transmitting the aggregated information to a base station.

Further, according to an embodiment of the present disclosure, there is provided a relay method including receiving information aggregated for a plurality of wireless communication devices from a base station, obtaining individual information for each of the plurality of wireless communication devices based on the aggregated information, and individually transmitting the individual information to each of the plurality of wireless communication devices.

Further, according to an embodiment of the present disclosure, there is provided a wireless communication system including a plurality of wireless communication devices, and a relay device including a receiving unit for receiving information from the plurality of wireless communication devices, a storage unit for accumulating the information received from the plurality of wireless communication devices by the receiving unit, an information processing unit for aggregating the information accumulated in the storage unit, and a transmitting unit for transmitting the information aggregated by the information processing unit to a base station.

Further, according to an embodiment of the present disclosure, there is provided a wireless communication system including a base station for transmitting information aggregated for a plurality of wireless communication devices, and a relay device including a receiving unit for receiving the aggregated information from the base station, an information processing unit for obtaining individual information for each of the plurality of wireless communication devices based on the aggregated information received by the receiving unit, and a transmitting unit for individually transmitting the individual information obtained by the information processing unit to each of the plurality of wireless communication devices.

Further, according to an embodiment of the present disclosure, there is provided a base station including an information processing unit for aggregating information for the plurality of wireless communication devices, and a transmitting unit for transmitting the information aggregated by the information processing unit to a relay device for relaying communication related to the plurality of wireless communication devices.

Further, according to an embodiment of the present disclosure, there is provided a wireless communication device. The wireless communication device receives information aggregated for a plurality of wireless communication devices from a base station, obtains individual information for each of the plurality of wireless communication devices based on the aggregated information, and receives the individual information from a relay device for individually transmitting the individual information to each of the plurality of wireless communication devices.

Advantageous Effects of Invention

As described above, according to the present disclosure, it is possible to mitigate the increase of network load by introducing a wireless communication device such as MTC terminal and a relay device.

DESCRIPTION OF EMBODIMENTS

Figure 1:
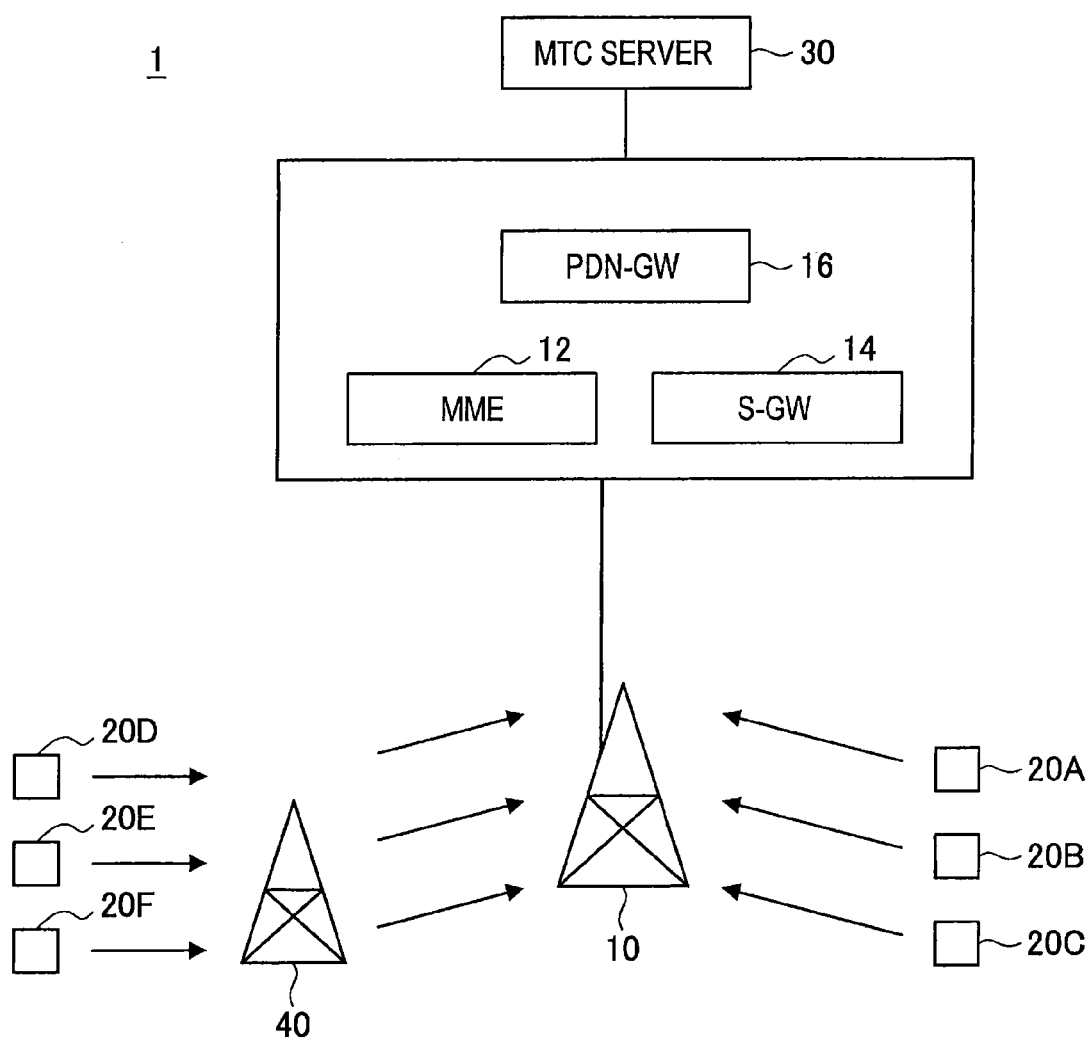
FIG. 1 is an explanatory diagram illustrating an exemplary configuration of a wireless communication system.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Also, in the specification and drawings, a plurality of structural elements having substantially the same functional configuration may be distinguished from each other by each having a different alphabetical letter added to the end of the same reference numeral. For example, a plurality of structural elements having substantially the same functional configuration may be distinguished from each other as necessary, such as MTC terminals 20A, 20B, and 20C. However, if it is not particularly necessary to distinguish each of a plurality of structural elements having substantially the same functional configuration, only the same reference numeral is assigned. For example, if it is not particularly necessary to distinguish between the MTC terminals 20A, 20B, and 20C, they are simply referred to as the MTC terminal 20.

Furthermore, the description will be given according to the following item order.

1. Configuration of Wireless Communication System
2. First Embodiment
2-1. Configuration of Relay Device according to First Embodiment
2-2. Operation of Relay Device according to First Embodiment
3. Second Embodiment
4. Conclusion

1. CONFIGURATION OF WIRELESS COMMUNICATION SYSTEM

At present, the standardization of 4G wireless communication system is being carried out in 3GPP. Embodiments of the present disclosure, as an illustrative example, are applicable to the 4G wireless communication system, and thus overview of 4G wireless communication system will be first described.

FIG. 1 is an explanatory diagram illustrating an exemplary configuration of a wireless communication system 1. As shown in FIG. 1, the wireless communication system 1 includes an eNodeB 10, a core network, MTC terminals 20, a MTC server 30, and a relay device 40. The core network includes a MME (Mobility Management Entity) 12, an S-GW (Serving Gateway) 14, and a PDN (Packet Data Network)-GW 16.

In addition, the MTC terminal 20 is an example of a wireless communication device. As an alternative example, the wireless communication device may be a mobile phone and the like that is a non-MTC terminal among user equipment (UE: User Equipment).

The eNodeB 10 is a radio base station that acts as a transmitter for transmitting wireless signals to the MTC terminal 20 and as a receiver for receiving wireless signals from the MTC terminal 20. Note that only one eNodeB 10 is shown in FIG. 1, but in practice a plurality of eNodeBs can be connected to the core network. In addition, although the illustration is omitted from FIG. 1, the eNodeB 10 is also communicated, with the user equipment other than the MTC terminal 20, for example.

The MME 12 is a device that controls the setup, opening and handover of sessions for data communication. The MME 12 is connected to the eNodeB 10 through an interface called X2. The S-GW 14 is a device that performs the routing, transfer, and so on, of user data. The PDN-GW 16 acts as a connection point to IP service network and transfers user data from and to the IP service network.

The MTC terminal 20 is a terminal designed specifically for applications for MTC which has been studied in 3GPP and performs a wireless communication with the eNodeB 10 depending on the applications. In addition, the MTC terminal 20 performs a bidirectional communication with the MTC server 30 through the core network. An example of the applications for the MTC is described below.

1. Security
2. Tracking & Tracing
3. Payment
4. Health
5. Remote Maintenance/Control
6. Metering
7. Consumer Devices As an example, the MTC terminal 20 may be an electrocardiogram measuring device corresponding to "4. Health" in the list above. In this case, if a user inputs a command for requesting the MTC server 30 to report electrocardiogram measurements, the MTC server 30 requests the MTC terminal 20 to report the electrocardiogram measurements, and then the electrocardiogram measurements are reported from the MTC terminal 20 to the MTC server 30.

As another example, the MTC terminal 20 may be a vending machine corresponding to "3. Payment" in the list above. In this case, if a user inputs a command for requesting the MTC server 30 to report the sales volume, the MTC server 30 requests the MTC terminal 20 to report the sales volume, and then the sales volume is reported from the MTC terminal 20 to the MTC server 30.

The characteristics of such MTC terminal 20 are described below. In addition, the MTC terminal 20 is not necessary to have all of the characteristics described below.

1. Low Mobility
2. Time Controlled
3. Time Tolerant
4. Packet Switched Only
5. Online Small Data Transmissions
6. Offline Small Data Transmission
7. Mobile Originated Only
8. Infrequent Mobile Terminated
9. MTC Monitoring
10. Offline Indication
11. Jamming Indication
12. Priority Alarm Message
13. Extra Low Power Consumption
14. Secure Connection
15. Location Specific Triger
16. Group based MTC Features Summarizing the above, the MTC terminal 20 has a little movement, has a few connections to the eNodeB 10 to communicate a small amount of data, and then again returns to idle mode. Further, some amount of delay is acceptable in data communication.

The relay device 40 relays communication between the eNodeB 10 and the MTC terminal 20. Thus, for example, even when MTC terminals 20D to 20F are spaced apart from the eNodeB 10 as shown in FIG. 1, they can communicate with the eNodeB 10 through the relay device 40. In addition, links between the eNodeB 10 and the relay device 40 may be referred to as backhaul link (Backhaul Link), and links between the relay device 40 and MTC terminals 20 may be referred to as access link.

A flow of relay communication performed by a relay device 70 according to a comparative example will be described below in order to clarify the general principles of embodiments of the present disclosure.

Figure 2:
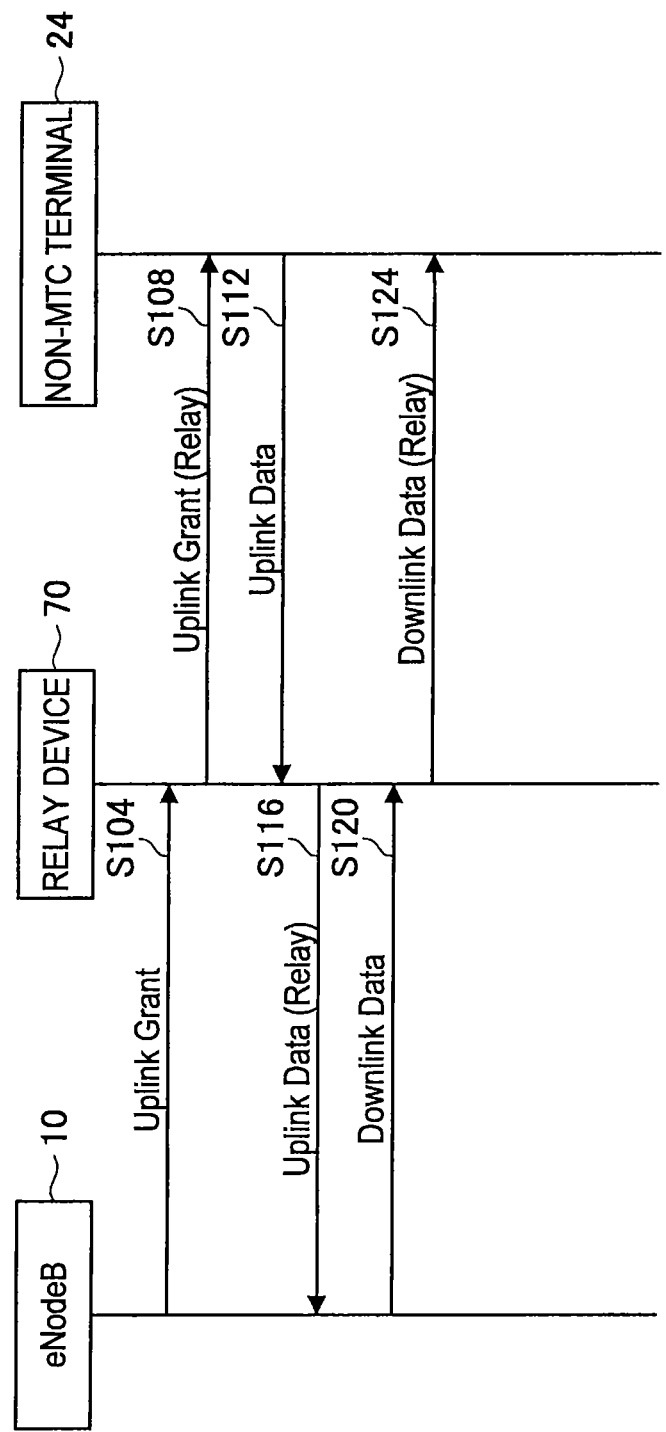
FIG. 2 is an explanatory diagram illustrating a flow of relay communication performed between an eNodeB and a non-MTC terminal by a relay device according to a comparative example.

FIG. 2 is an explanatory diagram illustrating a flow of relay communication performed between the eNodeB 10 and the non-MTC terminal 24 by the relay device 70 according to the comparative example. As shown in FIG. 2, the relay device 70 according to the comparative example, when receiving an uplink grant which contains scheduling information for the non-MTC terminal 24 belonging to the relay device 70 from the eNodeB 10 (S104), relays the uplink grant to the non-MTC terminal 24 (S108).

Then, the relay device 70, when receiving uplink data from the non-MTC terminal 24 (S112), relays the uplink data to the eNodeB 10 (S116). Similarly, when the eNodeB 10 transmits downlink data which will be transmitted to the non-MTC terminal 24 (S120), the relay device 70 relays the downlink data to the non-MTC terminal 24 (S124).

In this regard, it is considered that a variety of equipment will be operated as MTC terminals 20 in the future. Thus, it is expected that a large number of MTC terminals 20 would be accommodated in each cell. Further, when these MTC terminals 20 communicate with the eNodeB 10 through the relay device 70 according to the comparative example, the number of exchange of information would be doubled. These circumstances will be described below with reference to FIG. 3.

Figure 3:
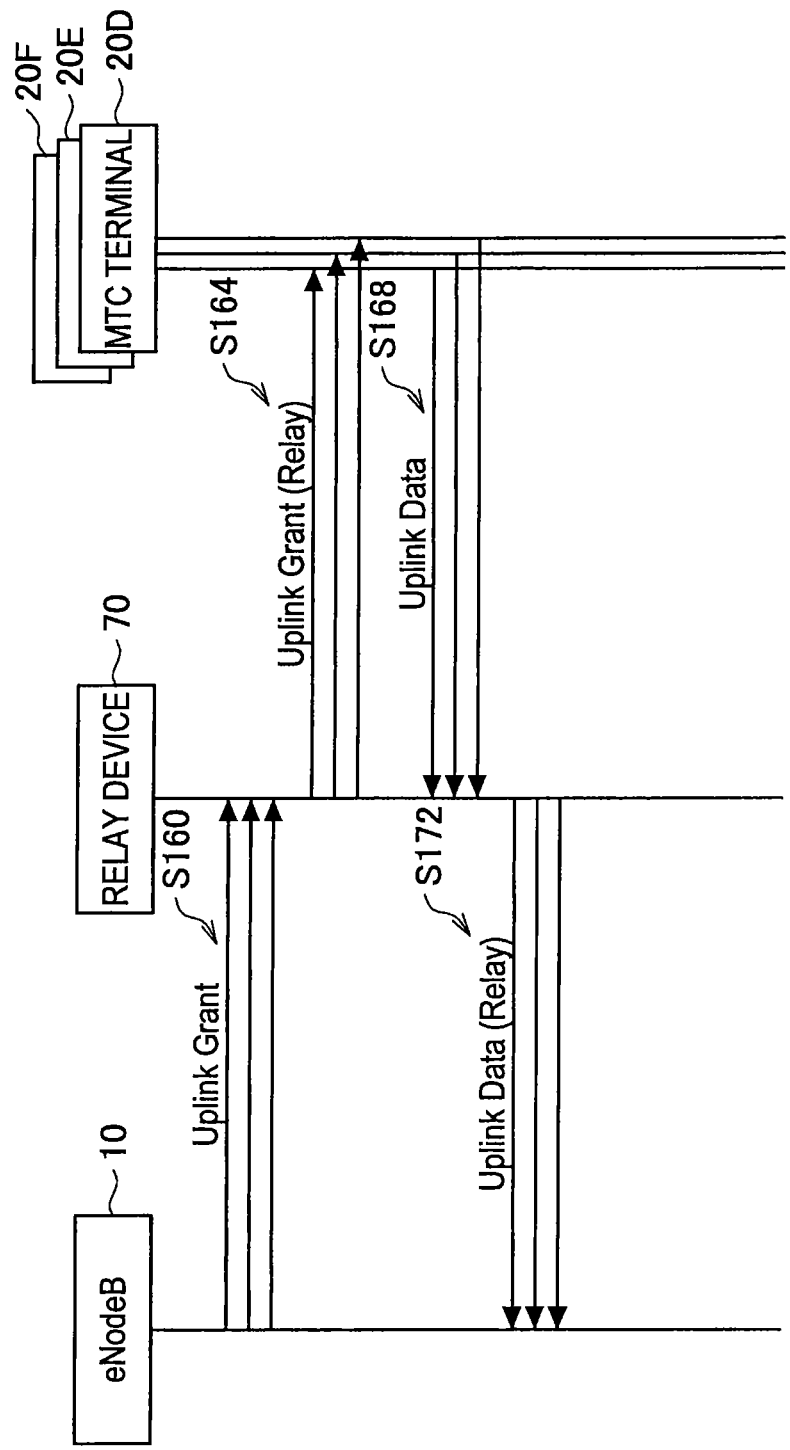
FIG. 3 is an explanatory diagram illustrating a flow of relay communication performed between an eNodeB and a MTC terminal by a relay device according to a comparative example.

FIG. 3 is an explanatory diagram illustrating a flow of relay communication performed between the eNodeB 10 and the MTC terminal 20 by the relay device 70 according to the comparative example. As shown in FIG. 3, the eNodeB 10 transmits individual uplink grants to the corresponding MTC terminals 20 (S160). The relay device 70, when receiving the uplink grants from the eNodeB 10, individually transmits the uplink grants to the corresponding MTC terminals 20 (S164).

Then, the relay device 70, when receiving the uplink grants from the respective MTC terminals 20 (S168), transmits individual uplink data transmitted from each of the respective MTC terminals 20 to the eNodeB 10 (S172).

Figure 4:
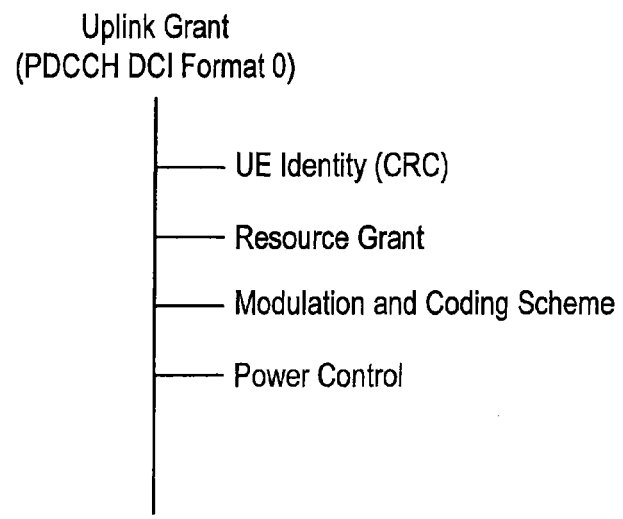
FIG. 4 is an explanatory diagram illustrating an exemplary configuration of an uplink grant.

In this regard, as shown in FIG. 4, the uplink grant includes a CRC field (UE Identity), a resource grant field, a MCS field (Modulation and Coding Scheme), a power control field, and so on.

The CRC field is scrambled with a unique code of a MTC terminal 20 which will be a destination. Thus, it is possible to specify a MTC terminal 20 which will be a destination, on the basis of the code used for scrambling the CRC field. The resource grant field contains information indicating a resource which acknowledges the transmission of uplink data from a MTC terminal 20. The MCS field or the power control field contains information that indicates a rate upon transmitting uplink data or a transmission power.

In the comparative example, the individual uplink grants are transmitted from the eNodeB 10 to the corresponding MTC terminals 20 through the relay device 70. Thus, the traffic for transmitting the uplink grant between the eNodeB 10 and the relay device 70 is increased in proportion to the increase of the number of MTC terminals 20 which will be destinations. The similar problem is occurred even when the data communication is performed.

Therefore, in the embodiments of the present disclosure, the relay device 40 is incorporated with a novel function for suppressing the increase of network load due to the increase of the number of MTC terminals 20. The relay device 40 according to the embodiment of the present disclosure will be described in detail below.

2. FIRST EMBODIMENT

[2-1. Configuration of Relay Device according to First Embodiment]

First, the configuration of the relay device 40 according to the first embodiment will be described with reference to FIG. 5.

Figure 5:
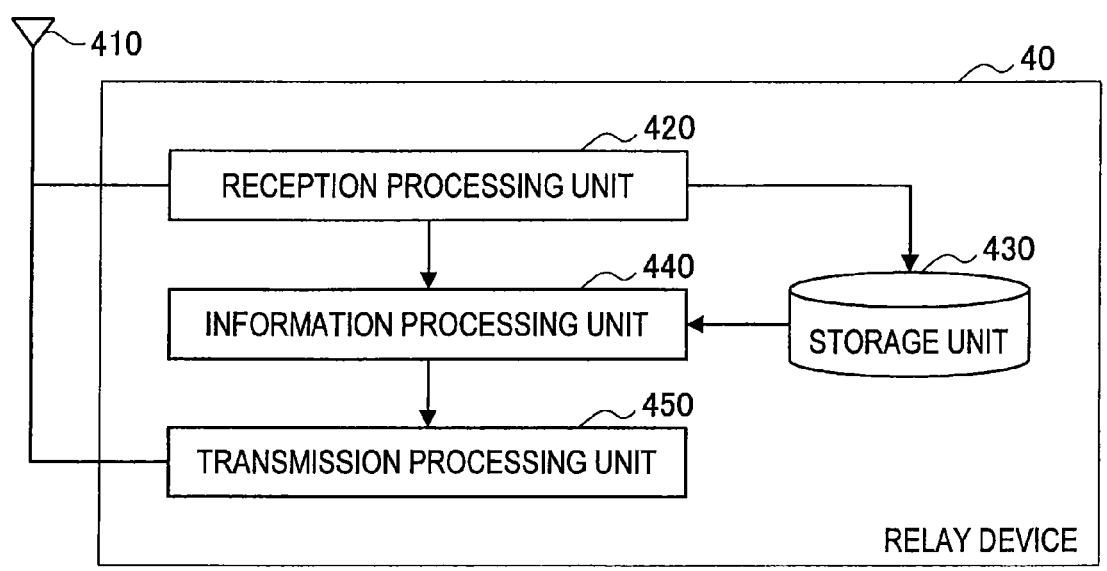
FIG. 5 is a functional block diagram illustrating a configuration of a relay device is according to a first embodiment.

FIG. 5 is a functional block diagram illustrating the configuration of the relay device 40 according to the first embodiment. As shown in FIG. 5, the relay device 40 includes an antenna 410, a reception processing unit 420, a storage unit 430, an information processing unit 440, and a transmission processing unit 450.

The antenna 410 receives a wireless signal from an eNodeB 10, a MTC terminal 20, a non-MTC terminal 24, or the like, and converts the wireless signal into an electric reception signal. The reception signal obtained by the antenna 410 is supplied to the reception processing unit 420. In addition, the antenna 410 converts a transmission signal supplied from the transmission processing unit 450 into a wireless signal, and transmits the wireless signal to the eNodeB 10, the MTC terminal 20, the non-MTC terminal 24, or the like.

Further, for convenience of explanation, although only one antenna is shown in FIG. 5, the relay device 40 may include a plurality of antennas. The relay device 40, when including a plurality of antennas, can perform MIMO (Multiple Input Multiple Output) communication, diversity communication, or the like. In this way, the antenna 410 functions as a receiving unit and a transmitting unit.

The reception processing unit 420 performs a demodulation process, a decoding process or the like on the reception signal supplied from the antenna 410. In addition, the relay device 40 may simply amplify the electric power of the reception signal, without performing the demodulation or decoding process in the reception processing unit 420 at the time of relaying.

The storage unit 430 accumulates information transmitted on the uplink among information obtained by the reception processing unit 420.

The information processing unit 440, when receiving information aggregated for the plurality of MTC terminals 20 from the eNodeB 10, obtains individual information for each of the plurality of MTC terminals 20 based on the aggregated information. Examples of the aggregated information, though the details will be described later, include a group uplink grant, a group ACK, and so on. Information with regard to an uplink grant for the plurality of MTC terminals 20 is aggregated in the group uplink grant. Information with regard to an ACK for the plurality of MTC terminals 20 is aggregated in the group ACK. In addition, examples of the individual information include an uplink grant relative to each of the MTC terminals 20, an ACK relative to each of the MTC terminals 20, and so on.

Moreover, the information processing unit 440 aggregates information from the plurality of MTC terminals 20 accumulated in the storage unit 430 into a single data frame with respect to the uplink. For example, when new uplink data transmitted from the plurality of MTC terminals 20 is accumulated, the information processing unit 440 aggregates these uplink data to generate group uplink data.

Further, the information processing unit 440 may aggregate information accumulated in the storage unit 430 to relay data received from the MTC terminals 20 within a predetermined period of time to the eNodeB 10. The predetermined period of time may be ten seconds, one minute, thirty minutes, one hour, or the like.

Furthermore, information related to an allowable delay time may be contained in a data frame of the uplink from the MTC terminal 20. In addition, the allowable delay time may be different for each of the MTC terminals 20. Therefore, the relay device 40, before the shortest time among the allowable delay time of an uplink data received from each of the MTC terminals 20 elapses, may aggregate information accumulated in the storage unit 430 until then and relay it to the eNodeB 10.

Alternatively, the information processing unit 440 may aggregate information accumulated in the storage unit 430 when the number of pieces of information accumulated in the storage unit 430 reaches a predetermined number. As an alternative, the information processing unit 440 may aggregate information accumulated in the storage unit 430 when the total sum of the amount of information accumulated in the storage unit 430 reaches an upper limit value.

The transmission processing unit 450 generates a transmission signal based on information obtained by the information processing unit 440 and supplies the transmission signal to the antenna 410. For example, the transmission processing unit 450 generates transmission signals of individual information (uplink grant, ACK, and so on) relative to each of the MTC terminals 20 obtained by the information processing unit 440 with respect to the downlink. The individual information generated by the transmission processing unit 450 is individually transmitted from the antenna 410 to the corresponding MTC terminals 20.

Further, the transmission processing unit 450 generates a transmission signal based on information aggregated by the information processing unit 440 with respect to the uplink. The transmission signal of the aggregated information generated by the transmission processing unit 450 is transmitted from the antenna 410 to the eNodeB 10.

[2-2. Operation of Relay Device According to First Embodiment]

The configuration of the relay device 40 according to the first embodiment of the present disclosure has been described above. Subsequently, an operation of a wireless communication system 1 which includes the relay device 40 according to the first embodiment of the present disclosure will be described.

(First Operation Example of Downlink)

Figure 6:
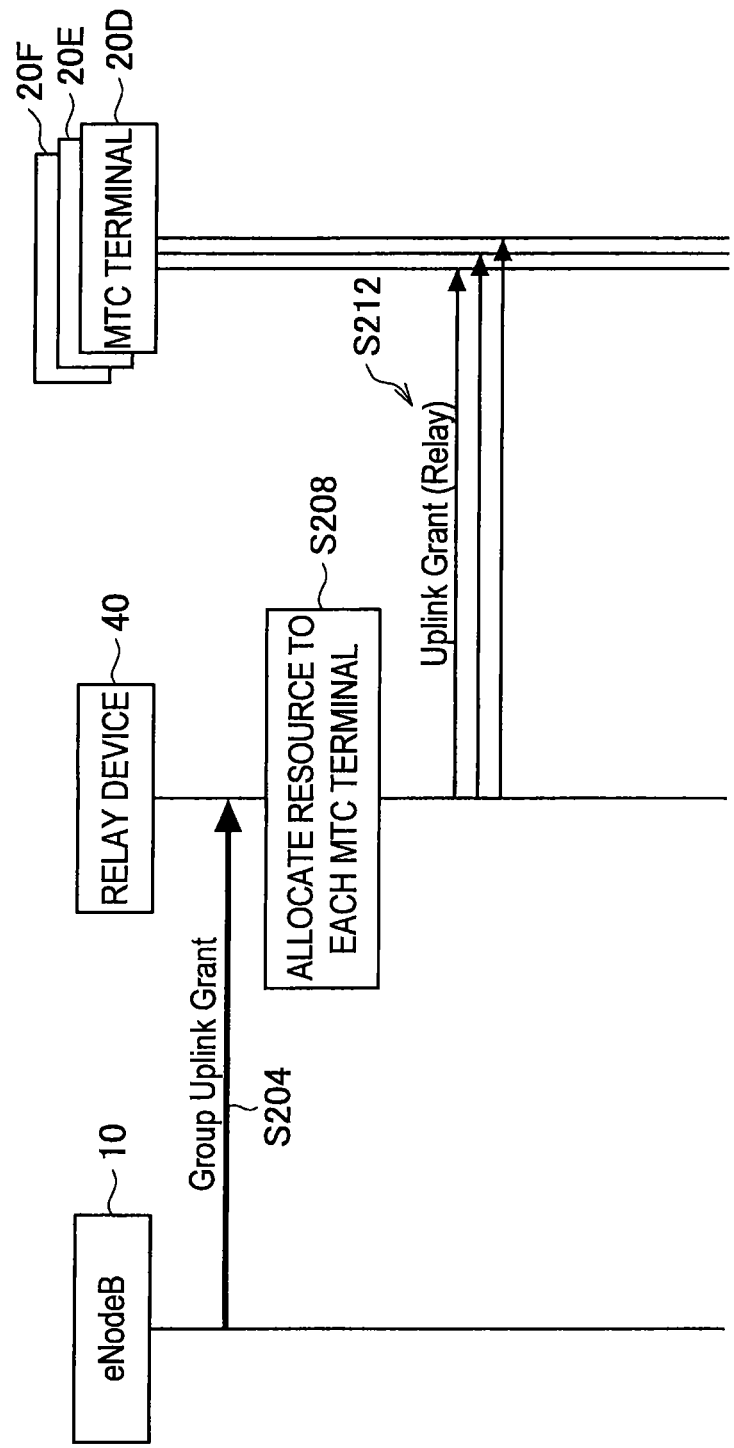
FIG. 6 is a sequence diagram illustrating a first operation example of a downlink.

FIG. 6 is a sequence diagram illustrating a first operation example of a downlink. As shown in FIG. 6, the eNodeB 10 transmits a group uplink grant to the relay device 40 (S204). Here, a configuration of the group uplink grant in the operation example will be described with reference to FIG. 7.

Figure 7:
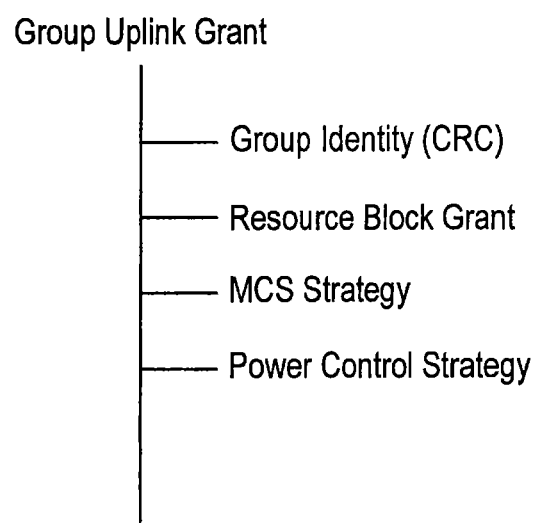
FIG. 7 is an explanatory diagram illustrating a configuration of a group uplink grant in the first operation example.

FIG. 7 is an explanatory diagram illustrating the configuration of the group uplink grant in the first operation example. As shown in FIG. 7, the group uplink grant in the operation example includes a CRC field (Group Identity), a resource block field, a MCS strategy field (Modulation and Coding Scheme Strategy), a power control strategy field, and so on.

The CRC field is a field for identifying a group consisting of a plurality of MTC terminals 20, and is scrambled with a unique code of each group. In addition, the plurality of MTC terminals 20 are grouped by the relay device 40 according to a predetermined criterion. Alternatively, the MTC terminals 20 may be grouped and the grouped information may be stored to the relay device 40 by a user, at the time such as when a MTC terminal 20, a relay device 40 or the like is provide. For this reason, the relay device 40 is aware of a unique code as identifier information of each group and identification information of a MTC terminal 20 belonging to each group. In addition, identifier information of each group has been transmitted in advance to the eNodeB 10 by the relay device 40, thus the eNodeB 10 can hold identifier information of each group received from the relay device 40 and scramble the CRC field with the unique code of the group based on the information. Further, the relay device 40 may or may not share with the eNodeB 10 the identification information of MTC terminals 20 belonging to each group. In addition, the relay device 40 may form a single group for all of the MTC terminals 20 belonging to the relay device 40.

The resource block field contains information indicating a resource which acknowledges the transmission of an uplink data from a plurality of MTC terminals 20 within a group identified by the CRC field.

The MCS strategy field or power control strategy field contains information that indicates a strategy of a rate or transmission power. For example, the MCS strategy field may contain information that indicates a maximum value of a rate, and the power control strategy field may contain information that indicates a maximum value of a transmission power. In addition, in the MCS strategy field or power control strategy field, information that indicates a strategy of a rate or transmission power may be contained in each resource.

Referring again to the operation example of FIG. 6, the relay device 40 generates an uplink grant relative to each of the MTC terminals 20 based on a group uplink grant as described above. Specifically, when the information processing unit 440 of the relay device 40 is aware of a unique code as identifier information of each group and identification information of MTC terminal 20 belonging to each group as described above, a MTC terminal 20 which will be a destination is specified on the basis of a code for scrambling the CRC field. Then, the information processing unit 440 of the relay device 40 performs resource allocation to each of the MTC terminals specified by the CRC field within the range of resource indicated by the resource block field (S208). Similarly, the information processing unit 440 determines a MTC or power of each of the MTC terminals 20 specified by the CRC field according to a MCS strategy field or power control strategy field. Then, an uplink grant relative to each of the corresponding MTC terminals 20 generated by the information processing unit 440 is individually transmitted from the antenna 410 by the relay device 40 (S212).

As mentioned above, according to the first operation example, the relay device 40 receives a group uplink grant from the eNodeB 10. Uplink grants relative to a plurality of MTC terminals 20 are aggregated in the group uplink grant. Particularly, this group uplink grant specifies a resource which acknowledges the allocation by the relay device 40, instead of individually specifying a resource to be allocated to each of the MTC terminals 20, thus the amount of information related to resource information is significantly suppressed. As a result, the amount of traffic between the eNodeB 10 and the relay device 40 can be suppressed, thereby reducing network load.

(Second Operation Example of Downlink)

Figure 8:
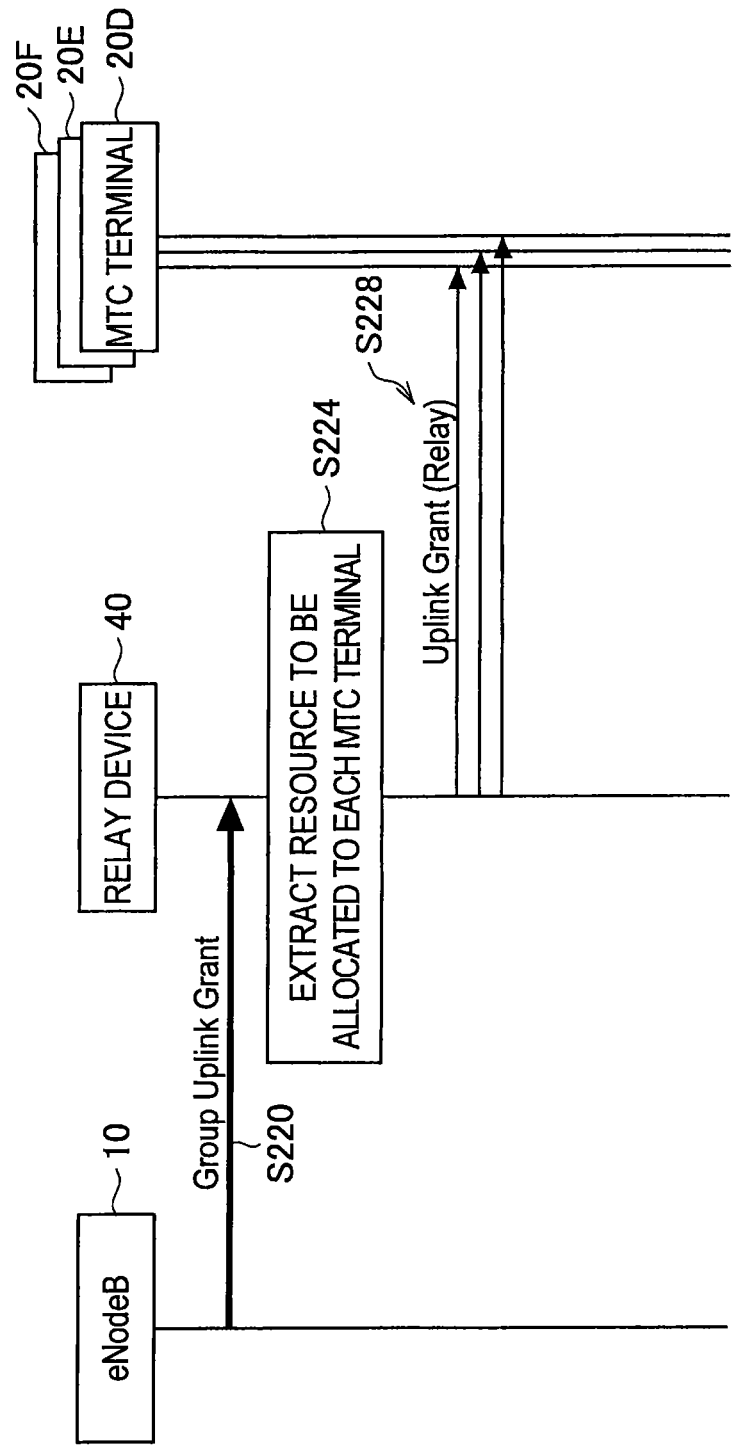
FIG. 8 is a sequence diagram illustrating a second operation example of a downlink.

FIG. 8 is a sequence diagram illustrating a second operation example of the downlink. As shown in FIG. 8, the eNodeB 10 first transmits a group uplink grant to the eNodeB 10 (S220). In this regard, the configuration of the group uplink grant in the operation example will be described with reference to FIG. 9.

Figure 9:
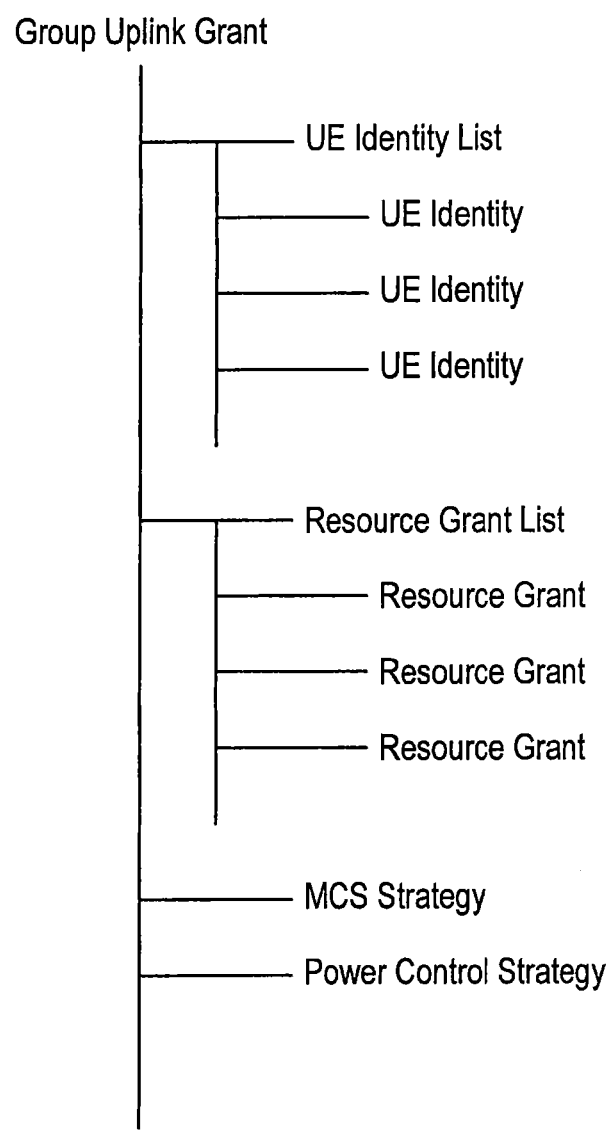
FIG. 9 is an explanatory diagram illustrating a configuration of a group uplink grant in the second operation example.

FIG. 9 is an explanatory diagram illustrating the configuration of the group uplink grant in the second operation example. As shown in FIG. 9, the group uplink grant in the operation example includes a user equipment identity list (UE Identity List), a resource grant list (Resource Grant List), a MCS strategy field, a power control strategy field, and so on.

The user equipment identity list is comprised of information for identifying each of the MTC terminals 20. The resource grant list contains information indicating a resource in which the transmission of uplink data from each of the MTC terminals 20 identified in the user equipment identity list is acknowledged. The MCS strategy field or power control strategy field contains information that indicates a strategy of a rate or transmission power, as similar to the first operation example.

Referring again to the operation example of FIG. 8, the relay device 40 generates an uplink grant relative to each of the MTC terminals 20, based on the group uplink grant as described above. Specifically, the information processing unit 440 of the relay device 40 generates the uplink grant by dividing information included in the group uplink grant, that is, by extracting a resource to be allocated to each of the MTC terminals 20 (S224). Similarly, the information processing unit 440 determines a MTC or power of each of the MTC terminal 20 identified in the user equipment identity list according to a MCS strategy field or power control strategy field.

Subsequently, the uplink grants relative to each of the MTC terminals 20 generated by the information processing unit 440 is individually transmitted from the antenna 410 by the relay device 40 (S228).

As mentioned above, according to the second operation example, the relay device 40 receives a group uplink grant in which uplink grants relative to a plurality of MTC terminals 20 are aggregated from the eNodeB 10. Unlike the first operation example, the group uplink grant is not intended to specify a resource which acknowledges the allocation by the relay device 40. However, compared to the case where the uplink grants relative to each of the MTC terminals 20 are individually received from the eNodeB 10, control fields such as a format ID field indicating frame content or a CRC field can be unified, thereby anticipating the effect on the traffic suppression.

(Operation Example of Uplink)

As above, there has been described that information communicated between the eNodeB 10 and the relay device 40 is grouped to suppress the traffic in the downlink. Similarly, also in the uplink, information communicated between the eNodeB 10 and the relay device 40 can be grouped to suppress the traffic. A flow of relay communication performed by the relay device 70 according to the comparative example will be described with reference to FIG. 10, and then the relay communication performed by the relay device 40 according to the embodiment of the present disclosure will be described.

Figure 10:
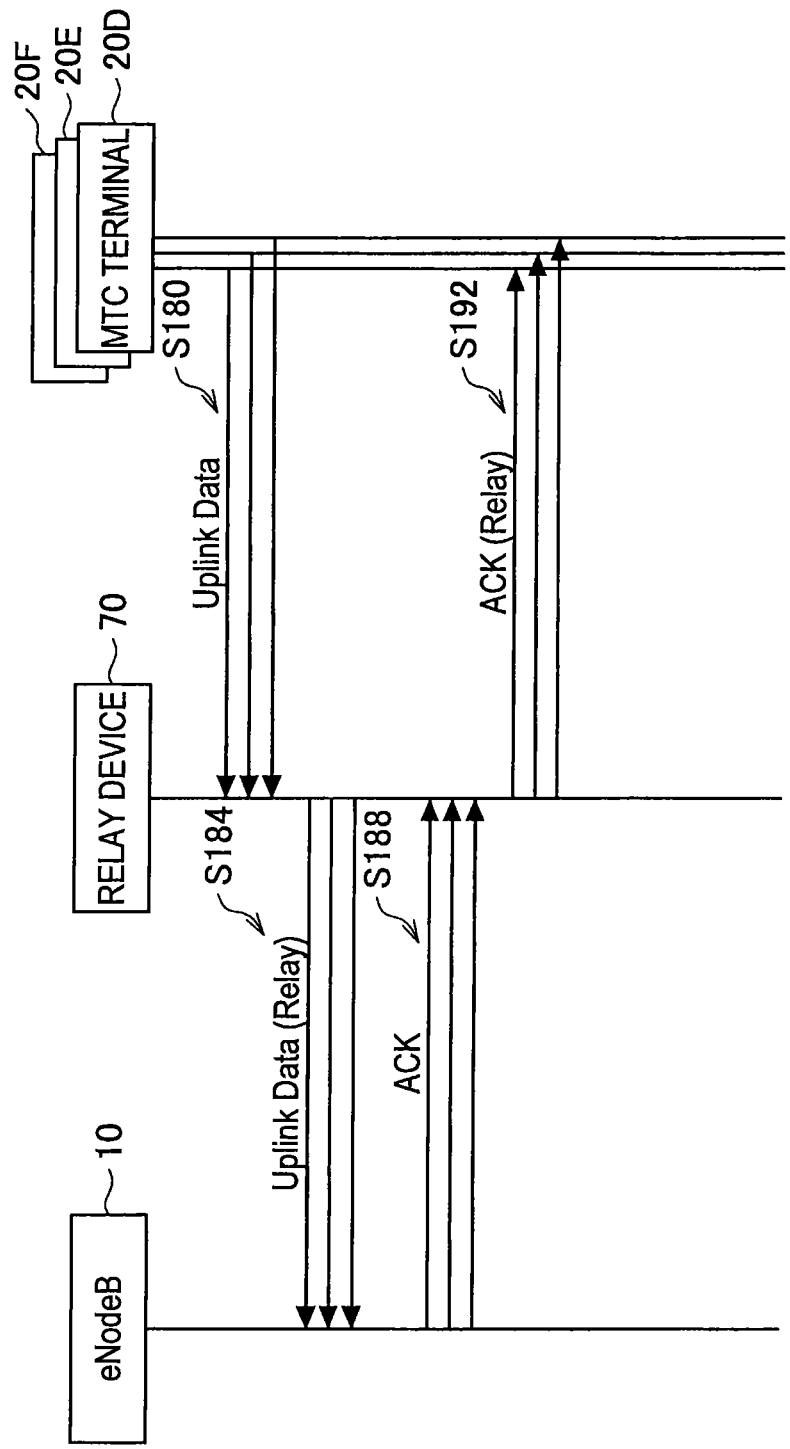
FIG. 10 is an explanatory diagram illustrating a flow of relay communication performed between an eNodeB and a MTC terminal by a relay device according to a comparative example.

FIG. 10 is an explanatory diagram illustrating a flow of relay communication performed between the eNodeB 10 and MTC terminal 20 by the relay device 70 according to a comparative example. As shown in FIG. 10, each MTC terminal 20 individually transmits uplink data using different resources (S180). The relay device 70, when receiving uplink data from each of the MTC terminals 20, individually transmits the received uplink data to the eNodeB 10 (S184). Then, the relay device 70, when receiving ACKs transmitted individually to each of the MTC terminals 20 from the eNodeB 10 (S188), transmits the ACK to each of the MTC terminals 20 (S192).

In this manner, the relay device 70 according to the comparative example individually transmits the uplink data received from each of the MTC terminal 20 to the eNodeB 10, and individually receives ACKs relative to each of the MTC terminals 20 from the eNodeB 10. On the other hand, the relay device 40 according to the embodiment of the present disclosure, as will be described below with reference to FIG. 11, can communicate the grouped uplink data or ACK between the eNodeB 10 and the relay device 40.

Figure 11:
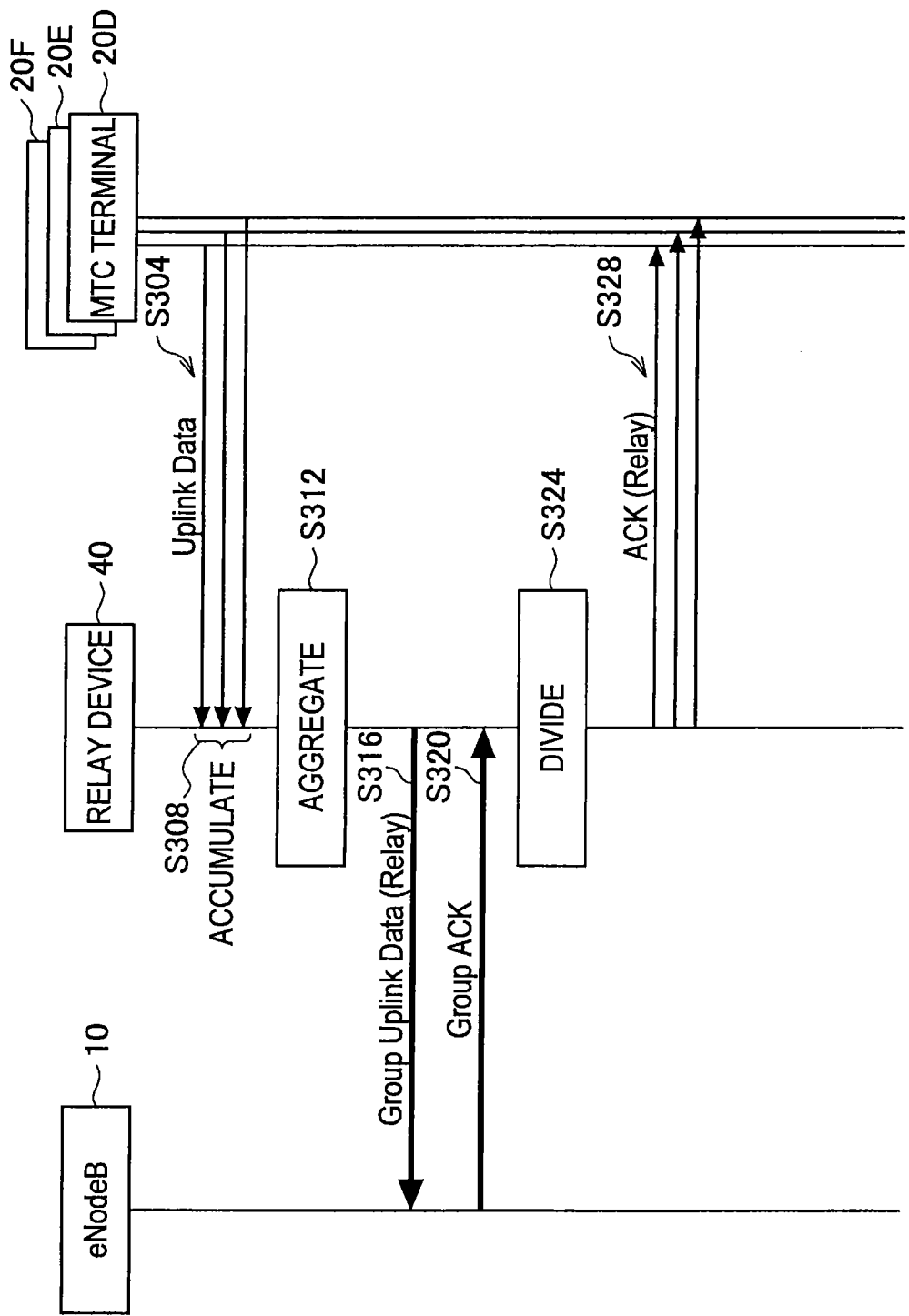
FIG. 11 is a sequence diagram illustrating an operation example of an uplink.

FIG. 11 is a sequence diagram illustrating an operation example of an uplink. As shown in FIG. 11, each MTC terminal 20 individually transmits uplink data using different resources (S304). The relay device 40, when receiving uplink data from each of the MTC terminals 20, accumulates the received uplink data to the storage unit 430 (S308).

Then, the information processing unit 440 of the relay device 40 aggregates the uplink data accumulated in the storage unit 430 to generate group uplink data (S312). The relay device 40 then, as shown in FIG. 11, transmits the group uplink data to the eNodeB 10 (S316).

In response to this, the eNodeB 10 transmits a group ACK in which ACK information for a plurality of the MTC terminals 20 is aggregated (S320). Then, the information processing unit 440 of the relay device 40 divides the group ACK to obtains ACKs for each of the MTC terminals 20 (S324). The relay device 40 then transmits the ACKs to the corresponding MTC terminals 20 (S328).

According to this operation example, as described above, unification of control fields such as a format ID field indicating frame content is possible by using group uplink data or group ACK. Thus, according to this operation example, it can be expected to reduce the amount of traffic in the uplink and downlink.

3. SECOND EMBODIMENT

The first embodiment has been described above. Next, the second embodiment of the present disclosure will be described.

As mentioned above, it is considered that communication performed by the MTC terminal 20 has often a low degree of urgency, and a certain delay time required to accumulate uplink data described in the first operation example is acceptable. On the other hand, it is expected that communication performed by the non-MTC terminal 24 such as a mobile phone will have a shorter amount of allowable delay time than the MTC terminal 20. Thus, the relay device 40 according to the second embodiment rapidly relays the uplink data from the non-MTC terminal 24 while accumulating and aggregating the uplink data from the MTC terminal 20. This second embodiment of the present disclosure will be described in detail below with reference to FIG. 12.

Figure 12:
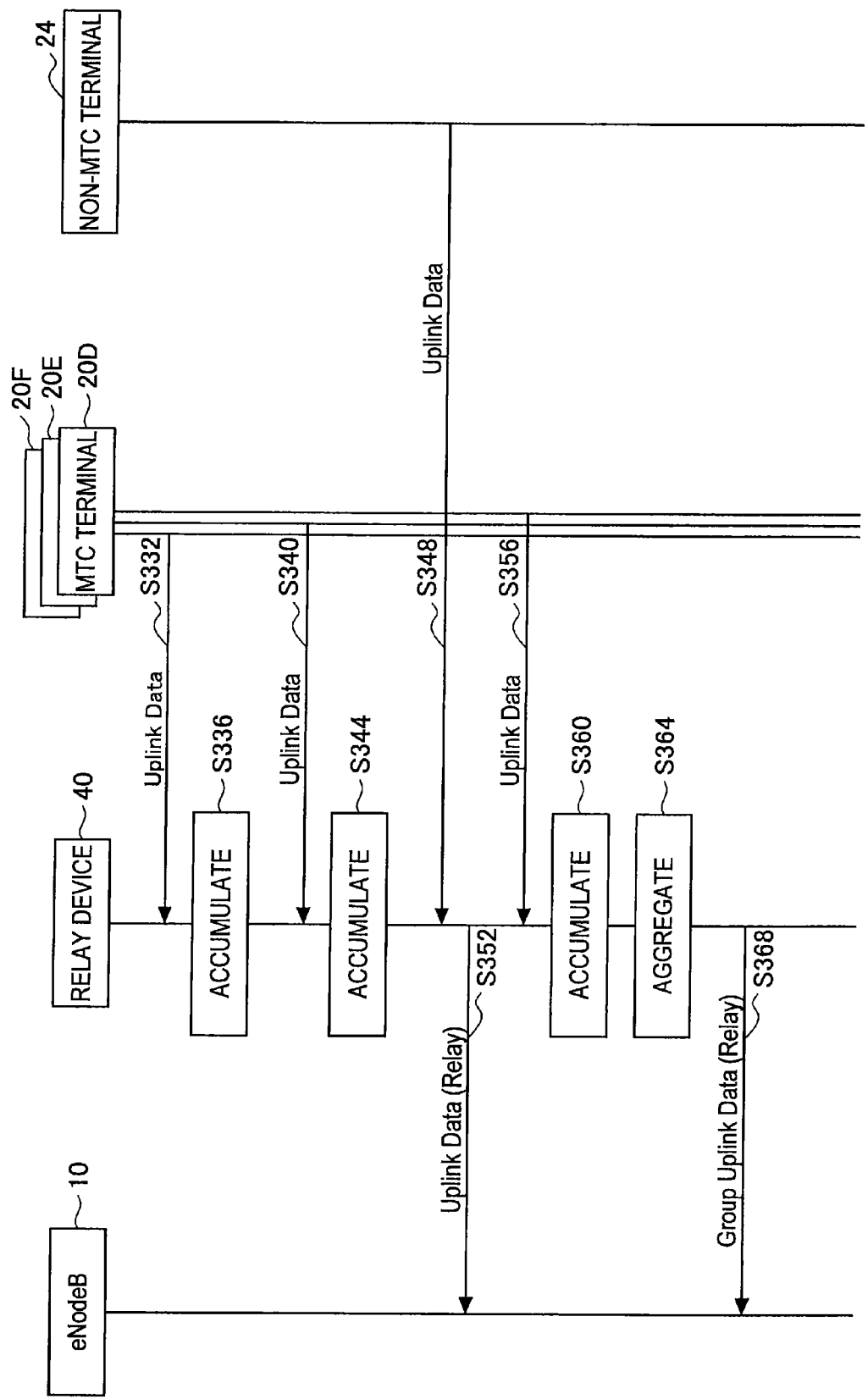
FIG. 12 is a sequence diagram illustrating an operation according to a second embodiment of the present disclosure.

FIG. 12 is a sequence diagram illustrating an operation according to the second embodiment of the present disclosure. As shown in FIG. 12, the relay device 40, when receiving uplink data from a MTC terminal 20F (S332), accumulates the uplink data to the storage unit 430 (S336). Similarly, the relay device 40, when receiving uplink data from a MTC terminal 20E (S340), accumulates the uplink data to the storage unit 430 (S344).

On the other hand, the relay device 40, when receiving uplink data from a non-MTC terminal 24 (S348), transmits the uplink data to the eNodeB 10 without aggregating the uplink data (S352).

Further, the relay device 40, when receiving uplink data from the MTC terminal 20E (S356), accumulates the uplink data to the storage unit 430 (S360). Then, the information processing unit 440 of the relay device 40 aggregates the uplink data accumulated in the storage unit 430 to generate group uplink data (S364). And then, the relay device 40 transmits the group uplink data to the eNodeB 10 (S368).

In order to realize the processes described above, when the relay device 40 receives uplink data, it determines whether this uplink data is transmitted from the MTC terminal 20 or from the non-MTC terminal 24. For example, when the uplink data contains information that indicates whether or not the uplink data is transmitted from the MTC terminal 20, or contains information that indicates whether or not the uplink data is transmitted from the non-MTC terminal 24, the relay device 40 may determine a terminal which will be a source on the basis of this information.

Alternatively, the relay device 40 may determine a terminal which will be a source on the basis of the amount of uplink data. More specifically at this point, data transmitted from the MTC terminal 20 is assumed to be data that indicates the water or electricity consumption or the like. Also, the amount of data transmitted from the MTC terminal 20 is expected to be smaller compared to that of data transmitted from the non-MTC terminal 24. Thus, the relay device 40 may determine that the MTC terminal 20 is a source terminal when the amount of uplink data is less than a predetermined value, and may determine that the non-MTC terminal 24 is a source terminal when the amount of uplink data is greater than or equal to the predetermined value.

In this way, the relay device 40 according to the second embodiment of the present disclosure can appropriately change the details of relay process depending on whether a source terminal of the uplink data is a MTC terminal 20.

4. CONCLUSION

As described above, according to the first embodiment of the present disclosure, in both of the uplink and downlink, the traffic can be suppressed by grouping information communicated between the eNodeB 10 and the relay device 40. In addition, the relay device 40 according to the second embodiment of the present disclosure can appropriately change the details of relay process depending on whether or not a source terminal of uplink data is a MTC terminal 20.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, each step in the process of the relay device 40 of the present specification do not necessarily have to be processed in a time series according to the order described as the sequence diagrams or flowcharts. For example, each step in the process of the relay device 40 may be processed in an order different from the order described as sequence diagrams, or may be processed in parallel.

Furthermore, a computer program for causing hardware such as CPU, ROM and RAM, embedded in the relay device 40 to realize an equivalent function as each element of the above-mentioned relay device 40 can also be created. Moreover, a storage medium having the computer program stored thereon is also provided.

REFERENCE SIGNS LIST 10 eNodeB
10 MTC terminal
24 Non-MTC terminal
410 Antenna
420 Reception processing unit
430 Storage unit
440 Information processing unit
450 Transmission processing unit

The invention claimed is:

1. A relay device, comprising:
    circuitry configured to:
        receive a plurality of first data frames that contain pieces of information from a plurality of wireless communication devices that include Machine Type Communications (MTC) terminals and non-Machine Type Communications (non-MTC) terminals;
        determine whether each of the pieces of information is from one of the MTC terminals or one of the non-MTC terminals;
        accumulate a first set of the pieces of information determined to be from the MTC terminals in the circuitry;
        aggregate the first set of the pieces of information determined to be from the MTC terminals and accumulated in the circuitry to a second data frame in an intermittent manner within an earliest timing among timings of respective first allowable delay times of the respective first set of the pieces of information,
        wherein a second allowable delay times of a respective second set of the pieces of information determined to be from the non-MTC terminals is shorter than the first allowable delay times of the respective first set of the pieces of information;
        transmit the aggregated first set of the pieces of information determined to be from the MTC terminals to a base station; and
        transmit a second set of the pieces of information determined to be from the non-MTC terminals to the base station individually.

2. The relay device according to claim 1, wherein the circuitry is further configured to aggregate the first of the pieces of information accumulated in the circuitry at a determined cycle.

3. The relay device according to claim 1, wherein the circuitry is further configured to determine a timing at which the first allowable delay time of each of the first set of the pieces of information accumulated in the circuitry elapses, and aggregate the first set of the pieces of information accumulated in the circuitry before the earliest timing among the timings of the first allowable delay time elapses.

4. The relay device according to claim 1, wherein the circuitry is further configured to aggregate the first set of the pieces of information accumulated in the circuitry based on a number of the first set of the pieces of information accumulated in the circuitry reaches a determined number.

5. The relay device according to claim 1, wherein the circuitry is further configured to aggregate the first set of the pieces of information accumulated in the circuitry based on a total amount of the first set of the pieces of information accumulated in the circuitry reaches an upper limit value.

6. A relay method, comprising:
    receiving a plurality of data frames containing pieces of information from each of a plurality of wireless communication devices that include Machine Type Communications (MTC) terminals and non-Machine Type Communications (non-MTC) terminals;
    determining, using circuitry, whether the pieces of information are from the MTC terminals or the non-MTC terminals;
    accumulating a first set of the pieces of information determined to be from the MTC terminals in the circuitry;
    aggregating, using the circuitry, the first set of the pieces of information determined to be from the MTC terminals and accumulated in the circuitry to a single data frame in an intermittent manner within an earliest timing among timings of respective first allowable delay times of the respective first set of the pieces of information,
    wherein a second allowable delay times of a respective second set of the pieces of information determined to be from the non-MTC terminals is shorter than the first allowable delay times of the respective first set of the pieces of information;
    transmitting the aggregated first set of the pieces of information determined to be from the MTC terminals to a base station; and relaying a second set of the pieces of information determined to be from the non-MTC terminals to the base station individually.

7. A wireless communication system, comprising:
a plurality of wireless communication devices that include Machine Type Communications (MTC) terminals and non-Machine Type Communications (non-MTC) terminals; and
a relay device that includes circuitry configured to:
receive a plurality of data frames that contain pieces of information from the plurality of wireless communication devices;
determine whether each of the pieces of information is from one of the MTC terminals or one of the non-MTC terminals;
accumulate a first set of the pieces of information determined to be from the MTC terminals in the circuitry;
aggregate the first set of the pieces of information determined to be from the MTC terminals and accumulated in the circuitry to a single data frame in an intermittent manner within an earliest timing among timings of respective first allowable delay times of the respective first set of the pieces of information,
wherein a second allowable delay times of a respective second set of the pieces of information determined to be from the non-MTC terminals is shorter than the first allowable delay times of the respective first set of the pieces of information;
transmit the aggregated first set of the pieces of information determined to be from the MTC terminals to a base station; and
transmit a second set of the pieces of information determined to be from the non-MTC terminals to the base station individually.

8. The relay device according to claim 1, wherein the circuitry is further configured to determine whether each piece of the pieces of information is from one of the MTC terminals or one of the non-MTC terminals based on indication information in the received pieces of information that indicates whether the piece of information is from one of the MTC terminals or one of the non-MTC terminals.

9. The relay device according to claim 1, wherein the circuitry is further configured to determine whether each piece of the pieces of information is from one of the MTC terminals or one of the non-MTC terminals based on a data amount of the piece of information from the MTC terminal or the non-MTC terminal.

10. The relay device according to claim 9, wherein one piece of the pieces of information is determined by the circuitry to be from one of the MTC terminals based on the data amount of the piece of information that is less than a determined value.

11. The relay device according to claim 9, wherein one of the pieces of information is determined by the circuitry to be from one of the non-MTC terminals based on the data amount of the piece of information that is greater than or equal to a determined value.

12. The relay device according to claim 1, wherein the circuitry is further configured to:
receive a third data frame that includes aggregated pieces of information from the base station;
extract individual pieces of information from the third data frame that correspond to the MTC terminals; and
transmit the extracted individual pieces of information individually to the corresponding MTC terminals.

* * * * *